United States Patent [19]

Christman

[11] 4,258,537
[45] Mar. 31, 1981

[54] SEED CORN DETASSELING MACHINE

[76] Inventor: Perry L. Christman, Villa Grove, Ill. 61956

[21] Appl. No.: 21,213

[22] Filed: Mar. 16, 1979

[51] Int. Cl.³ .......................................... A01D 45/02
[52] U.S. Cl. .......................................... 56/51; 56/63; 56/DIG. 1
[58] Field of Search ................. 56/51, 56, DIG. 1, 63, 56/15.9, 52, 59; 171/58

[56] References Cited

U.S. PATENT DOCUMENTS

| | | | |
|---|---|---|---|
| 1,308,376 | 7/1919 | Schlichter | 56/DIG. 1 |
| 2,397,249 | 3/1946 | Dostal | 171/58 |
| 2,626,497 | 1/1953 | Bohmker | 171/58 |
| 2,723,669 | 11/1955 | Pool et al. | 56/DIG. 1 |
| 2,957,292 | 10/1960 | Griffiths | 56/DIG. 1 |
| 2,966,022 | 12/1960 | Getz | 56/DIG. 1 |
| 3,043,073 | 7/1962 | Bornzin | 56/DIG. 1 |
| 3,090,188 | 5/1963 | Gorham | 56/DIG. 1 |
| 3,207,163 | 9/1965 | Lakin | 56/DIG. 1 |
| 3,402,532 | 9/1968 | Johnston et al. | 56/DIG. 1 |
| 3,524,308 | 8/1970 | Spry | 56/51 |
| 3,662,526 | 5/1972 | Smith | 56/63 |
| 3,724,184 | 4/1973 | Wright | 56/51 |
| 3,769,782 | 11/1973 | Cler | 56/51 |
| 3,855,761 | 12/1974 | Louks et al. | 56/51 |
| 4,026,092 | 5/1977 | Wehde | 171/58 |
| 4,027,733 | 6/1977 | Eisehardt et al. | 171/58 |

*Primary Examiner*—Paul J. Hirsch
*Attorney, Agent, or Firm*—Wegner, Stellman, McCord, Wiles & Wood

[57] ABSTRACT

A seed corn detasseling apparatus has a mounting base extending across the front of a wheeled vehicle, and three evenly spaced parallelogram linkages are vertically adjustable by separate hydraulic cylinders. A tool bar at the front of each linkage carries two laterally adjustable detasseling heads. Each head consists of a supporting frame the front of which forms an inverted V-shaped guide; and a forwardly and downwardly extending guide frame on the supporting frame cooperates with the inverted V-guide to guide upper leaves and tassels of corn plants between a pair of positively driven longitudinal rollers which are slightly spaced at the front and converge toward the rear. The rollers have short lands and grooves, with the grooves of one roller confronting the lands of the other roller. Tassels are pulled with practically no permanent damage to the upper leaves.

22 Claims, 5 Drawing Figures

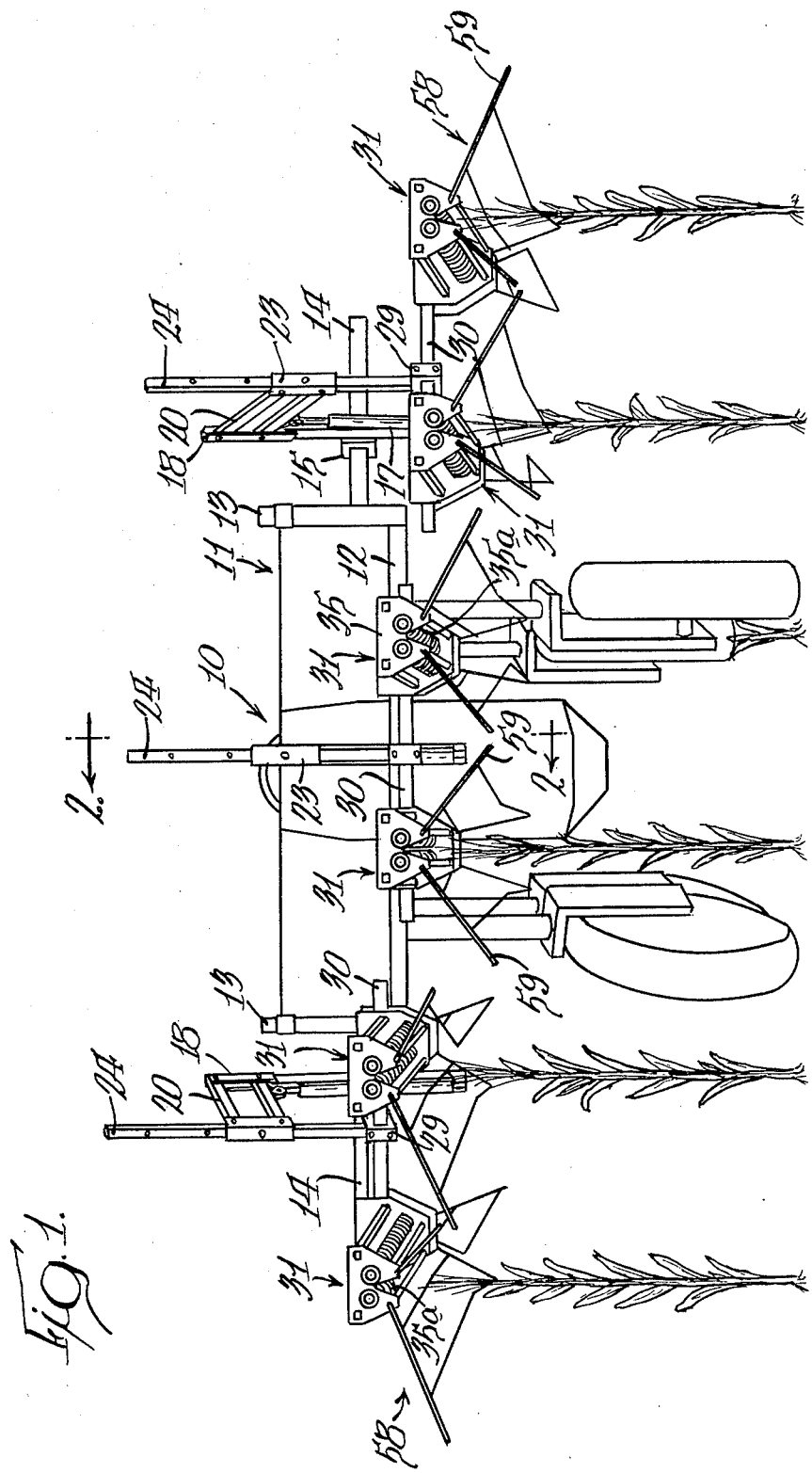

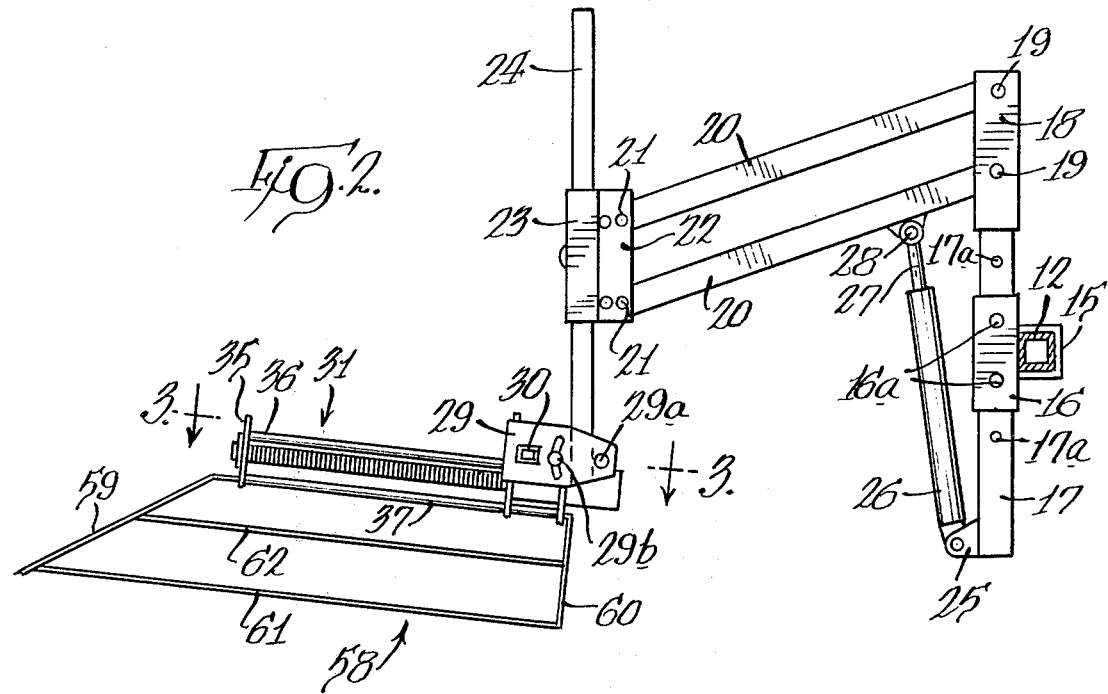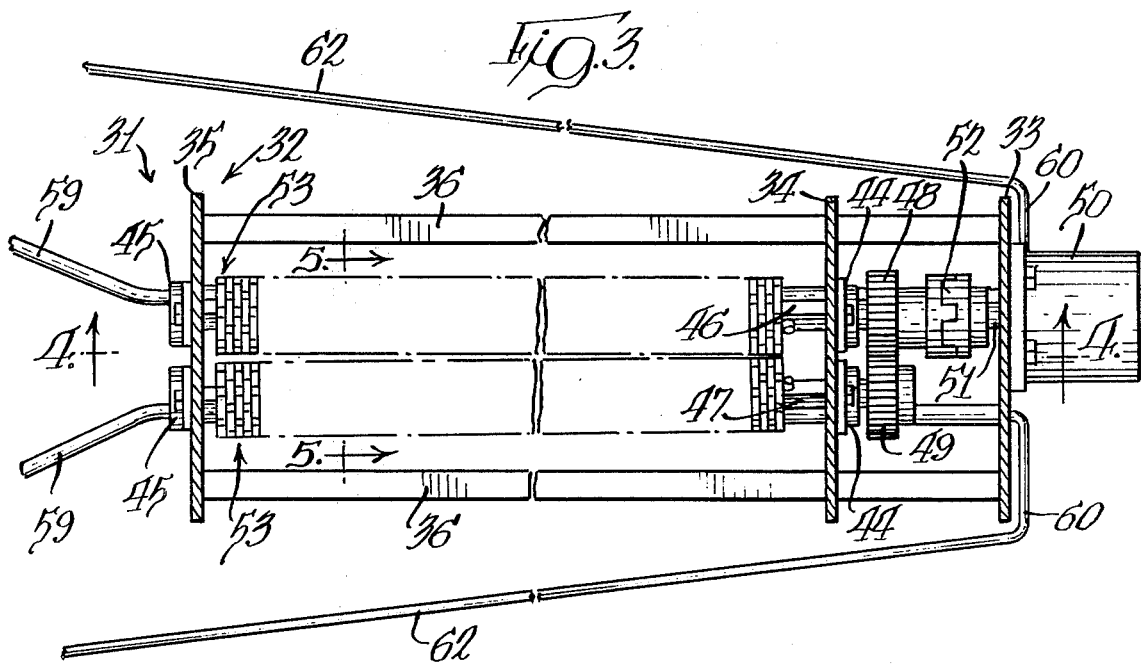

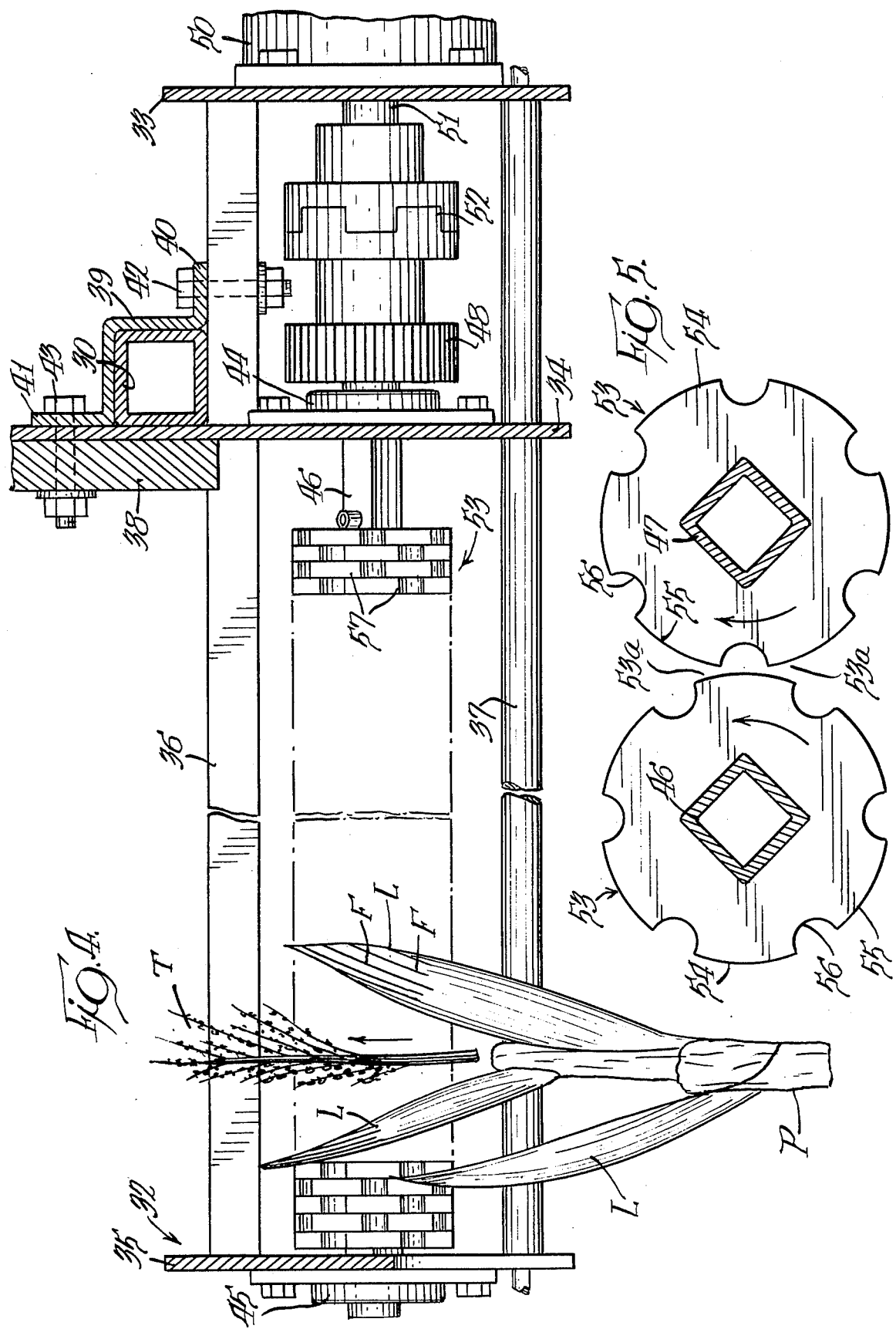

SEED CORN DETASSELING MACHINE

BACKGROUND OF THE INVENTION

A number of machines have been developed to eliminate the hand detasseling of seed corn which is necessary in hybrid seed corn production in which six rows of corn are detasseled and the next two rows are left with the tassels on to pollenate the six detasseled rows. Seed corn production requires 100% detasseling of the six rows, and a satisfactory machine must remove more than 95% of the tassels, and preferably in excess of 98%. The remaining tassels are hand stripped.

Detasseling is carried out long before the corn plants are mature, and a problem with most detasseling machines is that they either remove or destroy too many of the upper leaves which are needed for maximum plant growth. Furthermore, most prior art machines tend to leave too many tassels because they lack adequate means for guiding the upper end portions of twisted or misaligned corn plants into the detasseling heads.

The most pertinent prior art patents known to applicant are Dostal U.S. Pat. No. 2,397,249 and Cler U.S. Pat. No. 3,769,782. The former has a detasseling head with a pair of longitudinally extending rollers the surfaces of which are held firmly in contact by a compression spring at the rear of one roller; and the rollers have rubber surfaces with spiral grooves that tend to feed the tassels and leaves rearwardly; and the rollers snap the tassels upwardly out of their sockets. The powerful gripping action of the rollers tends to remove the upper leaves with the tassels. The apparatus of the Cler patent has a pair of rollers with intermeshing studs which also tend to remove the leaves with the tassels and in some cases can even pull an entire corn plant out of loose soil.

SUMMARY OF THE INVENTION

In accordance with the present invention, a supporting frame is mounted on a wheeled vehicle for movement along a row of seed corn; and a pair of detasseling rollers is journalled in the frame on fixed axes which are longitudinal of the line of movement of the vehicle, and the rollers have circumferential surfaces which are slightly spaced from one another and have lands and grooves with the grooves of one roller surface facing the lands of the other roller surface. Both rollers are positively driven so their surfaces move upwardly where they confront one another.

Preferably the roller axes converge slightly from front to rear and the roller surfaces are substantially in contact with one another at the rear.

Preferably the lands and grooves are short, and the angle subtended by each groove is substantially less than the angle subtended by each land.

The relationship between the rollers is such that they can apply a detasseling force to the tassels of the corn plant through the upper leaves, but without pulling the leaves off or permanently damaging them. Some of the "tissue" of a leaf may be removed from between the heavy longitudinal leaf fibers; but this does not permanently damage the leaves and causes no significant reduction in the capacity of the leaves to contribute to the growth of the corn plant.

Desirably, the supporting frame has a front plate with an inverted V-shaped guide which bends tall tassels down between the rollers; and a forwardly and downwardly extending guide frame also has guide rods below and to the sides of the rollers so as to do an effective job of guiding the upper end portions of all the corn plants in a row between the detasseling rollers.

A machine has six detasseling heads which are mounted for lateral adjustment upon three tool bars; and each tool bar is suspended from the front end of a parallelogram linkage that is vertically adjustable by means of a hydraulic cylinder.

THE DRAWINGS

FIG. 1 is a front elevational view of the apparatus of the invention with the three parallelogram linkages adjusted to different levels and illustrating the relationship of the six detasseling heads to six rows of seed corn;

FIG. 2 is a vertical sectional view on an enlarged scale taken substantially as indicated along the line 2—2 of FIG. 1;

FIG. 3 is a fragmentary horizontal sectional view on an enlarged scale taken substantially as indicated along the line 3—3 of FIG. 2;

FIG. 4 is a vertical sectional view on an enlarged scale taken substantially as indicated along the line 4—4 of FIG. 3 and illustrates the way the rollers pull a tassel upwardly out of its socket; and FIG. 5 is a fragmentary sectional view on an enlarged scale taken substantially as indicated along the line 5—5 of FIG. 3.

DETAILED DESCRIPTION OF THE INVENTION

Referring to the drawings in detail, and referring first to FIGS. 1 and 2, a wheeled vehicle, indicated generally at 10, has a transversely extending mounting base, indicated generally at 11, at its forward end. The mounting base 11 has a central supporting rail 12 at the lateral extremities of which are upright frame members 13 each of which carries a lateral supporting rail 14. The rails 12 and 14 are seen in FIG. 2 to be rectangular in cross section, and upon each rail is a laterally slidable collar 15 at the front of which is a sleeve 16 in which an upright supporting post 17 is slidably received for vertical adjustment. Holes 17a in the post may be aligned with holes 16a in the sleeve to receive fastening pins.

At the upper end of each post 17 is a fork 18 which receives a pair of vertically spaced pivots 19 for links 20 of a parallel linkage at the forward ends of which are pivots 21 that pivotally receive a link 22, so that the fork 18, the parallel links 20 and the link 22 provide a parallelogram linkage at the forward end of which is a tube 23 in which a vertical mast 24 is adjustably carried. At the lower end of each post 17 is a bifurcated bracket 25 which pivotally mounts a hydraulic cylinder 26 a piston rod 27 of which is pivotally connected at 28 to a bracket on the lower parallel link 20. Thus, the parallel linkages are independently vertically adjustable to change the height of the masts 24.

At the lower end of each mast is a bracket 29 which carries a hollow rectangular tool bar 30; and as seen in FIG. 2 each of the brackets 29 swings around a pivot 29a and is provided with a locking bolt 29b which extends through slots so that the angle of the tool bar 30 may be adjusted.

Supported for lateral adjustment upon each of the tool bars 30 is a detasseling head, indicated generally at 31, which extends forwardly from the tool bar so that angular adjustment of the bar changes the angular disposition of the detasseling head. Each of the detasseling heads 31 includes a supporting frame, indicated generally at 32, and as best seen in FIGS. 3 and 4, the supporting frame consists of a rear plate 33, an intermediate mounting plate 34, a front plate 35, upper longitudinal frame members 36 and lower longitudinal frame members 37. The mounting plate 34 has an upper block 38 welded to its forward surface; and a releasable clamp 39 has a lower horizontal flange 40 and an upper vertical flange 41 which bear, respectively, upon the upper longitudinal frame members 36 and the mounting plate 34; so the mounting bracket 39 may be secured to the longitudinal frame members 36 by bolts and nuts 42, and to the mounting plate 34 and upper block 38 by bolts and nuts 43. The bracket 39 thus serves as a releasable clamp by means of which the detasseling head 31 is clamped upon the tool bar 30 and may be adjusted along the tool bar.

The various adjustments permit the space between the detasseling heads 31 to be varied so as to align them with six rows of corn plants; and the vertical adjustment of the parallelogram linkages by means of the hydraulic cylinders 26 permits the two detasseling heads on a tool bar to be at a different level from the detasseling heads on the other tool bars. This gives the machine great flexibility in detasseling corn plants in a field where the plants in adjacent rows are of different heights.

As best seen in FIG. 3, hollow bearing assemblies 44 in the mounting plate 34 and thrust bearing assemblies 45 in the front plate 35 provide journals for a driven shaft 46 and an idler shaft 47, both of which are square and are carried in bushings in the bearing assemblies. At the rear of the driven shaft 46 is a drive pinion 48, while at the rear of the idler shaft 47 is an idler pinion 49. A hydraulic motor 50 mounted upon the back plate 33 has a shaft 51 which is selectively coupled to the drive pinion 48 through a solenoid clutch 52.

As best seen in FIGS. 4 and 5, the shafts 46 and 47 serve as cores for detasseling rollers, indicated generally at 53 which have outer portions on said cores. As seen in FIG. 3, the shafts 46 and 47 converge slightly from front to rear, so the confronting portions 53a of the cylindrical roller surfaces 54 are spaced apart a short distance at their forward ends and are substantially in contact at their rearward ends. The space between the rollers at the front may be from ⅛" to 3/16" and at the rear from ⅛" to 0.

The circumferential roller surfaces 54 have lands 55 and grooves 56, and at the confronting area of the roller surfaces the grooves of one roller are seen to face the lands of the other roller. As seen in FIG. 5, there are six lands and six grooves around the circumference of the roller, so one land and one groove subtend an arc of 60° with the land occupying 40° and the groove 20°. The diameter of the rollers is 2.875" (7.3025 cm). Consequently, as seen in FIG. 5, only about 10° of the surface of the lands 55 on the two sides of the groove 56 of one roller directly face a land on the other roller as the two rollers rotate in the direction of the arrows seen in FIG. 5. Typically, lands are 1" wide and grooves ½" wide.

As a matter of convenience, the rollers 53 have their outer portions fabricated from a multiplicity of discs 57, fixedly mounted on the cores provided by the shafts 46 and 47. Each disc 53 is ⅓" (0.84582 cm) thick; and successive discs are circumferentially offset so that the lands and grooves are discontinuous from end to end of the rollers. The discs are preferably fabricated from an elastomeric material which is somewhat yielding. An adequate idea of the hardness of the discs may be gathered from the fact that the discs for a prototype were cut from motor vehicle tire carcasses.

Referring now to FIG. 1, the front plates 35 are seen to have inverted V-shaped guides 35a which tend to guide tassels and leaves of a corn plant between the detasseling rollers 53; and in addition, there are guide means, indicated generally at 58, which guide the upper end portion of a corn plant toward the rollers. Thus, even if the plants of a row are not entirely straight, or if some plants have bent or twisted stalks, the upper end portions of all the plants in a row are guided into the space between the rollers 53.

As seen in FIGS. 1 and 2, the guide means 58 consists of front guide rods 59 which are secured to the lower extremities of the front plates 35 at their rearward ends and extend downwardly and outwardly forward of the front plates. The guide means 58 also has rear rods 60 which are secured to the back plates 33 and extend outwardly and downwardly from those plates; and longitudinal rods 61 and 62 connect the front and rear guide rods 59 and 60. The guide means 58 extends about two feet below the horizontal median plane of the rollers 53.

As best seen in FIG. 4, when the detasseling machine is operated the upper end portion of a corn plant P, including the uppermost leaves L and tassel T are guided between the rollers 53 which subject the leaves and tassel to an upward pulling force which is sufficient to pull the tassel from its socket and discharge it onto the ground. The action of the rollers upon the leaves L is such that the tissue of the leaves between the longitudinal fibers F may be removed in a small area; but it has so little effect upon the leaves that their capacity for contributing to plant nourishment is not materially impaired.

The foregoing detailed description has been given for clearness of understanding only and no unnecessary limitations should be understood therefrom as modifications will be obvious to those skilled in the art.

I claim:

1. A seed corn detasseling apparatus comprising:
a supporting frame;
means mounting said frame on a wheeled vehicle for movement along a row of seed corn;
a pair of detasseling rollers which have shafts journalled in said frame on fixed axes which are longitudinal of the line of movement of the vehicle, said shafts providing roller cores, said rollers including outer portions of somewhat yielding elastomeric material fixed on said cores, said rollers having circumferential surfaces at least the more forward parts of which are slightly spaced from one another, and said circumferential roller surfaces having lands and grooves with the grooves of one roller surface facing the lands of the other roller surface without intermeshing;
guide means on said frame forward of and below said rollers for guiding the uppermost leaves and tassels between said rollers;
and means for positively rotating both said rollers about said axes so their surfaces move upwardly where they confront one another, said yielding roller outer portions causing minimal leaf damage while said rollers pull a tassel from its socket by upward force exerted through the uppermost leaves.

2. The apparatus of claim 1 in which the roller axes converge slightly from front to rear and the roller surfaces are substantially in contact with one another at the rear.

3. The apparatus of claim 2 in which the lands and grooves are short.

4. The apparatus of claim 3 in which each roller outer portion comprises a multiplicity of short discs fixed to the core, successive ones of said discs being offset so the lands and grooves are discontinuous.

5. The apparatus of claim 3 in which the angle subtended by each groove is substantially less than the angle subtended by each land.

6. The apparatus of claim 1 in which the lands and grooves are short.

7. The apparatus of claim 6 in which each roller outer portion comprises a multiplicity of short discs fixed to the core, successive ones of said discs being offset so the lands and grooves are discontinuous.

8. The apparatus of claim 7 in which the angle subtended by each groove is substantially less than the angle subtended by each land.

9. The apparatus of claim 1 in which the means mounting the supporting frame includes means for adjusting the height of the roller axes above the ground and means for tilting the roller axes at different angles to the horizontal.

10. The apparatus of claim 1 in which the guide means consists of rods which are secured to the frame, said guide means having leading rods which are inclined downwardly, forwardly and outwardly from the vicinity of the front of the rollers, and lateral rods which are below the rollers and laterally remote from the roller axes.

11. The apparatus of claim 10 in which the supporting frame has a front plate in which the rollers are journalled, and said front plate has a central guide in the shape of an inverted V, so as to bend tall tassels downwardly between the rollers.

12. The apparatus of claim 11 in which the roller axes converge slightly from front to rear and the roller surfaces are substantially in contact with one another at the rear.

13. The apparatus of claim 12 in which the lands and grooves are short.

14. The apparatus of claim 13 in which each roller outer portion comprises a multiplicity of short discs fixed to the core, successive ones of said discs being offset so the lands and grooves are discontinuous.

15. The apparatus of claim 14 in which the angle subtended by each groove is substantially less than the angle subtended by each land.

16. The apparatus of claim 15 in which the means mounting the supporting frame includes means for adjusting the height of the roller axes above the ground and means for tilting the roller axes at different angles to the horizontal.

17. A seed corn detasseling apparatus comprising:
a wheeled vehicle;
a transversely extending mounting base on the front of said vehicle;
three equally spaced independent parallelogram linkages supported on and extending forwardly from said base;
a transverse tool bar supported at the front of each of said linkages;
a pair of supporting frames mounted for lateral adjustment on each tool bar so that said frames may be aligned with six adjacent rows of seed corn in a field;
hydraulic cylinder means for moving each of said linkages to independently adjust the height of said tool bars from the ground;
a pair of detasseling rollers journalled in each of said frames on fixed axes which are longitudinal of the line of movement of the vehicle, said rollers having circumferential surfaces at least the more forward parts of which are slightly spaced from one another, and said circumferential roller surfaces having lands and grooves with the grooves of one roller surface facing the lands of the other roller surface;
and means for positively rotating both said rollers about said axes so their surfaces move upwardly where they confront one another.

18. The apparatus of claim 17 in which the roller axes converge slightly from front to rear and the roller surfaces are substantially in contact with one another at the rear.

19. The apparatus of claim 18 in which the lands and grooves are short.

20. The apparatus of claim 19 in which the angle subtended by each groove is substantially less than the angle subtended by each land.

21. The apparatus of claim 17 which includes guide means on each of said frames consisting of rods which are secured to the frame, said guide means having leading rods which are inclined downwardly, forwardly and outwardly from the vicinity of the front of the rollers, and lateral rods which are below the rollers and laterally remote from the roller axes, the forward ends of said leading rods on adjacent frames being substantially in contact with one another.

22. The apparatus of claim 17 which includes means mounting each supporting frame on the tool bar so the roller axes are downwardly inclined from front to rear, said mounting means providing for adjustment of the angle of inclination of the roller axes.

* * * * *